United States Patent
Køgs et al.

(10) Patent No.: US 12,025,091 B2
(45) Date of Patent: Jul. 2, 2024

(54) ROTOR FOR A WIND TURBINE WITH A PITCH BEARING UNIT

(71) Applicant: Vestas Wind Systems A/S, Aarhus (DK)

(72) Inventors: Lasse Køgs, Anderesen (DK); Peter Bækhøj, Aarhus C (DK); Anna Elena Teidelt, Tilst (DK); Simon Kabus, Viborg (DK)

(73) Assignee: Vestas Wind Systems A/S, Aarhus N. (DK)

(*) Notice: Subject to any disclaimer, the term of this patent is extended or adjusted under 35 U.S.C. 154(b) by 0 days.

(21) Appl. No.: 17/050,860

(22) PCT Filed: Apr. 26, 2019

(86) PCT No.: PCT/DK2019/050126
§ 371 (c)(1),
(2) Date: Oct. 27, 2020

(87) PCT Pub. No.: WO2019/210919
PCT Pub. Date: Nov. 7, 2019

(65) Prior Publication Data
US 2021/0231098 A1    Jul. 29, 2021

(30) Foreign Application Priority Data
Apr. 30, 2018    (DK) .......................... PA 2018 70251

(51) Int. Cl.
*F03D 80/70*    (2016.01)
*F03D 1/06*    (2006.01)
(Continued)

(52) U.S. Cl.
CPC .......... *F03D 1/0675* (2013.01); *F03D 1/0658* (2013.01); *B29D 99/0028* (2013.01);
(Continued)

(58) Field of Classification Search
CPC ...... F03D 1/0658; F03D 1/0675; F03D 80/70; F03D 1/0664; F03D 80/701; F05B 2260/79; B29D 99/0028; B29L 2031/085
See application file for complete search history.

(56) References Cited

U.S. PATENT DOCUMENTS

| 4,420,354 A | 12/1983 | Gougeon et al. |
| 4,989,999 A | 2/1991 | Siemensmeyer |

(Continued)

FOREIGN PATENT DOCUMENTS

| CN | 102691719 A | 9/2012 |
| CN | 103502664 A | 1/2014 |

(Continued)

OTHER PUBLICATIONS

European Patent Office, International Search Report and Written Opinion in PCT Application No. PCT/DK2019/050126, Jul. 23, 2019.

(Continued)

*Primary Examiner* — Sang K Kim
(74) *Attorney, Agent, or Firm* — Wood Herron & Evans LLP (57) ABSTRACT

A rotor (1) for a wind turbine is disclosed. The rotor (1) comprises a hub (11) and at least one wind turbine blade (10), each wind turbine blade (10) being mounted on the hub (11) via a bearing unit (2). Each bearing unit (2) comprises a C-shaped bearing element (3) forming an inner ring and a T-shaped bearing element (4) forming an outer ring. The C-shaped bearing element (3) comprises a first bearing element part (12) and a second bearing element part (13). An interface (14) between the first bearing element part (12) and the second bearing element part (13) is positioned in such a manner that a third raceway pair (8) is formed between a protruding portion (5) of the T-shaped bearing element (4) and the first bearing element part (12) of the C-shaped (Continued)

bearing element (3) and the hub (11) or the wind turbine blade (10) is attached to the second bearing element part (13) of the C-shaped bearing element (3).

16 Claims, 7 Drawing Sheets

(51) Int. Cl.
  *B29D 99/00* (2010.01)
  *B29L 31/08* (2006.01)

(52) U.S. Cl.
  CPC ......... *B29L 2031/085* (2013.01); *F03D 80/70* (2016.05); *F05B 2260/79* (2013.01)

(56) References Cited

U.S. PATENT DOCUMENTS

| | | | | |
|---|---|---|---|---|
| 8,282,353 B2* | 10/2012 | Russ | ................. | F16C 33/34 |
| 8,764,300 B2* | 7/2014 | Errard | ................. | F16C 19/545 |
| | | | | 384/619 |
| 9,062,661 B2* | 6/2015 | Frank | ................. | F03D 80/70 |
| 9,472,976 B2 | 10/2016 | Luo et al. | | |
| 9,879,656 B2* | 1/2018 | Schroppel | ............. | F16C 19/492 |
| 9,909,567 B2* | 3/2018 | Frank | ................. | F03D 80/70 |
| 10,125,812 B2 | 11/2018 | Hestermann et al. | | |
| 2008/0213095 A1 | 9/2008 | Bech et al. | | |
| 2009/0022442 A1* | 1/2009 | Bech | ................. | F16C 19/54 |
| | | | | 384/454 |
| 2009/0175724 A1 | 7/2009 | Russ et al. | | |
| 2009/0257697 A1 | 10/2009 | Andersen | | |
| 2010/0084079 A1* | 4/2010 | Hayden | ................. | B29C 70/222 |
| | | | | 156/189 |
| 2011/0115233 A1 | 5/2011 | Schroppel | | |
| 2012/0243819 A1* | 9/2012 | Errard | ................. | F03D 80/70 |
| | | | | 384/619 |
| 2012/0263598 A1 | 10/2012 | Thomsen et al. | | |
| 2014/0010660 A1* | 1/2014 | Handreck | ........... | F16C 19/381 |
| | | | | 416/205 |
| 2014/0023305 A1 | 1/2014 | Frank | | |
| 2016/0025068 A1 | 1/2016 | Frank et al. | | |
| 2018/0283362 A1* | 10/2018 | Minadeo | ............ | F03D 1/0658 |

FOREIGN PATENT DOCUMENTS

| | | |
|---|---|---|
| DE | 1575423 A1 | 11/1969 |
| DE | 2647588 A1 | 4/1978 |
| DE | 3034008 A1 | 4/1982 |
| DE | 20320626 U1 | 2/2005 |
| DE | 102005026141 A1 | 12/2006 |
| DE | 102015112056 A1 | 1/2017 |
| EP | 2094981 A2 | 9/2009 |
| WO | 03082551 A1 | 10/2003 |
| WO | 2006131301 A2 | 12/2006 |
| WO | 2007003866 A1 | 1/2007 |
| WO | 2007082532 A1 | 7/2007 |
| WO | 2008074322 A2 | 6/2008 |
| WO | 2009103473 A2 | 8/2009 |

OTHER PUBLICATIONS

Danish Patent and Trademark Office, Search and Examination Report in PA 2018 70251, Oct. 26, 2018.

European Patent Office, Intention to Grant in EP Application No. 19721983.5, Jul. 14, 2022.

China National Intellectual Property Administration, Office Action issued in corresponding Chinese Patent Application No. 2019800272276.X, with English translation, dated Feb. 17, 2023.

China National Intellectual Property Administration, office action issued in corresponding CN Application No. 2019/0027276.X, dated Sep. 18, 2023.

European Patent Office, Notice of Opposition in EP 19721983.5, dated Sep. 6, 2023 (Suzlon).

European Patent Office, Notice of Opposition in EP 19721983.5, dated Sep. 9, 2023 (Thyssenkrupp).

European Patent Office, Notice of Opposition in EP 19721983.5, dated Sep. 12, 2023 (Liebherr).

European Patent Office, Notice of Opposition in EP 19721983.5, dated Sep. 12, 2023 (GE).

IMO, T-Solid 41PC, Next Level Pitch Bearing, www.imo.de, 1000/20000753/I/TS/GB/Sep16.

Burton et al, Wind Energy Handbook, John Wiley & Sons, Ltd., 2001.

General Electric Company Space Division, MOD-1 Wind Turbine Generator Analysis and Design Report, Mar. 1979 DOE/NASA/0058-79/2—vol. 1, NASA CR-159495.

Hamrock and Anderson, NASA Reference Publication 1105, Rolling-Element Bearings, Jun. 1933.

Craftech Industries, 6 Most Popular Types of Mechanical Bearings. Jun. 11, 2017.

* cited by examiner

ROTOR FOR A WIND TURBINE WITH A PITCH BEARING UNIT

FIELD OF THE INVENTION

The present invention relates to a rotor for a wind turbine, the rotor comprising a hub and at least one wind turbine blade being mounted on the hub via a bearing unit. The rotor of the invention is very suitable for handling extreme loads on the bearing units of the wind turbine blades. The present invention further relates to a wind turbine comprising such a rotor.

BACKGROUND OF THE INVENTION

Wind turbines normally comprise a tower having a nacelle mounted thereon, and with a rotor mounted rotatably on the nacelle. A number of wind turbine blades are mounted on the rotor for catching the incoming wind and causing the rotor to rotate relative to the nacelle. The wind turbine blades may be mounted on the rotor via bearing units in order to allow them to perform pitch movements, i.e. in order to allow the wind turbine blades to change the angle of attack between the incoming wind and the wind turbine blades.

The bearing units interconnecting the wind turbine blades and the hub may each be in the form of a three-row roller bearing unit, i.e. a bearing unit comprising three raceway pairs, each accommodating a plurality of rollers. Such three-row roller bearing units may comprise a C-shaped bearing element and a T-shaped bearing element arranged coaxially with respect to a rotational axis of the bearing, and with the raceway pairs formed there between, and with the wind turbine blade attached to one of the bearing elements and the hub attached to the other bearing element.

In order to assemble such a bearing unit, it is necessary to split the C-shaped bearing element into two bearing element parts. When the bearing unit is subjected to high overturning moments from the wind turbine blade, the two bearing element parts are prone to slide relative to each other in the interface defined there between. If the two bearing element parts slide relative to each other in this manner, subsequent loading combined with pitching of the bearing unit may accelerate wear and fatigue failure of the bearing unit.

Furthermore, a high overturning moment on the bearing unit may cause the interface between the bearing element parts to open. When this occurs, blade bolts which clamp the two bearing element parts together will be highly stressed, and this may result in bolt fracture or loss of bolt pretension, which may in turn lead to premature failure of the bolts or sliding in the interface between the bearing element parts.

It has previously been assumed that, in order to address the issues described above, the interface between bearing element parts should be positioned in such a manner that loads to be transferred between the wind turbine blade and the hub do not pass the interface.

U.S. Pat. No. 8,282,353 B2 discloses a bearing unit for a long rotor blade. The bearing unit comprises two annular elements that can be rotated in relation to each other and are directly or indirectly connected to the rotor blade hub and to the rotor blade. At least two running tracks can be axially staggered in relation to each other and comprise peripheral rolling bodies.

DESCRIPTION OF THE INVENTION

It is an object of embodiments of the invention to provide a rotor for a wind turbine, in which the risk of sliding of bearing element parts of one of the bearing elements is reduced as compared to prior art rotors.

It is a further object of embodiments of the invention to provide a rotor for a wind turbine, in which the risk of premature fatigue failure of bearing units is reduced as compared to prior art rotors.

According to a first aspect the invention provides a rotor for a wind turbine, the rotor comprising a hub and at least one wind turbine blade, each wind turbine blade being mounted on the hub via a bearing unit, each bearing unit comprising:

a C-shaped bearing element defining an axially arranged surface and two radially arranged surfaces, the C-shaped bearing element forming an inner ring of the bearing unit,     a T-shaped bearing element comprising a protruding portion arranged between the radially arranged surfaces of the C-shaped bearing element, the T-shaped bearing element forming an outer ring of the bearing unit,     a first raceway pair being formed between the protruding portion of the T-shaped bearing element and a first radially arranged surface of the C-shaped bearing element, a second raceway pair being formed between the protruding portion of the T-shaped bearing element and a second radially arranged surface of the C-shaped bearing element, and a third raceway pair being formed between the protruding portion of the T-shaped bearing element and the axially arranged surface of the C-shaped bearing element, wherein the hub is attached to one of the C-shaped bearing element and the T-shaped bearing element and a wind turbine blade is attached to the other of the C-shaped bearing element and the T-shaped bearing element, and wherein the C-shaped bearing element comprises a first bearing element part and a second bearing element part, and an interface between the first bearing element part and the second bearing element part is positioned in such a manner that the third raceway pair is formed between the protruding portion of the T-shaped bearing element and the first bearing element part of the C-shaped bearing element and the hub or the wind turbine blade is attached to the second bearing element part of the C-shaped bearing element.

Thus, according to the first aspect the invention provides a rotor for a wind turbine. The rotor comprises a hub and at least one wind turbine blade. Each wind turbine blade is mounted on the hub via a bearing unit, thereby allowing the wind turbine blades to perform pitching movements relative to the hub.

Each bearing unit comprises a C-shaped bearing element and a T-shaped bearing element, and the C-shaped bearing element forms an inner ring of the bearing unit and the T-shaped bearing element forms an outer ring of the bearing unit. Accordingly, the bearing units are arranged co-axially around an axis of rotation of the bearing unit, with the C-shaped bearing element closer to the axis of rotation of the bearing unit than the T-shaped bearing element.

In the present context the term 'C-shaped bearing element' should be interpreted to mean a bearing element having a cross section with a shape which is similar to a 'C', i.e. defining a recess which can receive a protruding portion from another bearing element.

Similarly, in the present context the term 'T-shaped bearing element' should be interpreted to mean a bearing element having a cross section with a shape which is similar to a 'T', i.e. with a protruding portion. However, it should be understood, that the T-shaped bearing element could instead have a cross section with a shape which is similar to an 'L' or the like, as long as the T-shaped bearing element has a protruding portion which can be received in the recess defined by the C-shaped bearing element.

Thus, the C-shaped bearing element defines an axially arranged surface and two radially arranged surfaces. In the present context the term 'axially arranged' should be interpreted to mean that the surface extends substantially parallel to the axis of the rotation of the bearing unit. Similarly, in the present context the term 'radially arranged' should be interpreted to mean that each of the surfaces extends along a radial direction relative to the axis of rotation of the bearing unit, i.e. each of the surfaces extends in a plane being substantially perpendicular to the axis of rotation of the bearing unit. Accordingly, the axially arranged surface and the two radially arranged surfaces delimit an inner recess or space of the C-shaped bearing element, in which a protruding portion of the T-shaped bearing element can be received.

A first raceway pair is formed between the protruding portion of the T-shaped bearing element and a first radially arranged surface of the C-shaped bearing element. Thereby the first radially arranged surface of the C-shaped bearing element forms one boundary, or one raceway, of the first raceway pair and an outer surface of the protruding portion of the T-shaped bearing element forms another boundary or another raceway, of the first raceway pair, and a plurality of roller elements are positioned between these two raceways.

Furthermore, a second raceway pair is formed between the protruding portion of the T-shaped bearing element and a second radially arranged surface of the C-shaped bearing element. Similarly to the description above regarding the first raceway pair, the second radially extending surface of the C-shaped bearing element and an outer surface of the T-shaped bearing element form boundaries, or raceways, of the second raceway pair, and a plurality of roller elements are positioned between these two raceways.

Finally, a third raceway pair is formed between the protruding portion of the T-shaped bearing element and the axially arranged surface of the C-shaped bearing element. Accordingly, the axially arranged surface of the C-shaped bearing element and an outer surface of the protruding portion of the T-shaped bearing element form boundaries, or raceways, of the third raceway pair, and a plurality of roller elements are positioned between these two raceways.

Thus, the bearing unit is a three-row bearing unit.

In order to allow the bearing unit to be assembled, with the protruding portion of the T-shaped bearing element arranged between the radially arranged surfaces of the C-shaped bearing element, and with roller elements arranged in the three raceway pairs as described above, it is necessary to form the C-shaped bearing element from two separate parts which are connected to each other during assembly of the bearing unit.

Accordingly, the C-shaped bearing element comprises a first bearing element part and a second bearing element part, defining an interface there between. The interface is positioned in such a manner that the third raceway pair is formed between the protruding portion of the T-shaped bearing element and the first bearing element part of the C-shaped bearing element, and the hub or the wind turbine blade is attached to the second bearing element part of the C-shaped bearing element.

Thus, the third raceway pair is not formed on the same bearing element part of the C-shaped bearing element which has the hub or the wind turbine blade attached thereto. Thereby loads originating from, e.g., radial forces acting on the wind turbine blade, and which need to be transferred to the hub, via the roller elements of the third raceway pair, must pass the interface between the first bearing element part and the second bearing element part of the C-shaped bearing element. This is counter-intuitive, since the interface would normally be regarded as a weakness in the design of the bearing unit.

It has surprisingly turned out that positioning the interface between the first bearing element part and the second bearing element part of the C-shaped bearing element in the manner described above results in improved handling of high overturning moments, while the expected disadvantages during normal operation with smaller loads are not as significant as foreseen. Accordingly, the rotor according to the first aspect of the invention performs better with respect to handling of extreme loads than prior art rotors.

It is further an advantage that the C-shaped bearing element forms an inner ring of the bearing unit, while the T-shaped bearing element form an outer ring of the bearing unit, because the elastic deformation of the bearing inner ring and outer ring, when subjected to an overturning moment, results in the first and second raceway pair remaining parallel, which ensures that the rolling elements are subjected to forces acting on the centre of the roller in the lengthwise direction of the roller. This leads to a more evenly distributed, and hence lower, contact pressure between the rolling element and the raceway pairs resulting in increased fatigue and extreme load capacity of the bearing unit.

The hub may be attached to the T-shaped bearing element, and the wind turbine blade may be attached to the C-shaped bearing element. According to this embodiment, the hub is attached to the outer ring of the bearing unit, and the wind turbine blade is attached to the inner ring of the bearing unit.

As an alternative, the wind turbine blade could be attached to the T-shaped bearing element, i.e. to the outer ring of the bearing unit, and the hub could be attached to the C-shaped bearing element, i.e. to the inner ring of the bearing unit.

The interface between the first bearing element part and the second bearing element part may be positioned between the protruding portion of the T-shaped bearing element and a radially arranged surface of the C-shaped bearing element, as viewed along an axial direction. According to this embodiment, the protruding portion of the T-shaped bearing element is positioned at one side of the interface, as seen in the axial direction, while one of the radially arranged surfaces of the C-shaped bearing element, and thereby the corresponding raceway pair, is positioned at another side of the interface, as seen in the axial direction.

The interface between the first bearing element part and the second bearing element part of the C-shaped bearing element may be positioned closer to the radially arranged surface of the C-shaped bearing element than to the protruding portion of the T-shaped bearing element. For instance, the interface may be positioned between 50% and 100% of the distance from the protruding portion of the T-shaped bearing element to the radially arranged surface of the C-shaped bearing element, such as between 60% and 90%, such as approximately 80%.

As an alternative, the interface may be arranged closer to the protruding portion of the T-shaped bearing element than to the radially arranged surface of the C-shaped bearing element.

The interface between the first bearing element part and the second bearing element part of the C-shaped bearing element may intersect a part of the C-shaped bearing element defining the radially arranged surface of the C-shaped bearing element. According to this embodiment, each of the first and second bearing element parts is substantially L-shaped, i.e. the C-shaped bearing element is formed from two substantially L-shaped bearing element parts. Furthermore, it is ensured that each of the axially arranged surfaces is entirely formed on one of the bearing element parts.

The first bearing element part and the second bearing element part of the C-shaped bearing element may be assembled by means of bolts. According to this embodiment, the first bearing element part and the second bearing element part are bolted together, thereby forming the C-shaped bearing element, during assembly of the bearing unit. This is a very easy and reliable manner of assembling the first bearing element part and the second bearing element part.

As an alternative, the first bearing element part and the second bearing element part may be assembled in any other suitable manner, e.g. by means of wires.

The hub or the wind turbine blade may be attached to a radially extending part of the C-shaped bearing element, the radially extending part defining one of the radially extending surfaces. As described above, the C-shaped bearing element may comprise an axially extending part and two radially extending parts, defining a recess there between. The axially extending surface and the radially extending surfaces face the interior of this recess, and the three raceway pairs of the bearing unit are, thus, positioned in the recess. According to this embodiment, the hub or the wind turbine blade is attached to an outer surface of one of the radially extending parts of the C-shaped bearing element.

As an alternative, the hub or the wind turbine blade may be attached to an axially extending part of the C-shaped bearing element.

The radially extending surfaces of the C-shaped bearing element may be axially displaced from each other. Thereby the first and second raceway pairs are also axially displaced from each other. Thus, according to this embodiment, the radially extending surfaces, and thereby the first and second raceway pairs, are arranged with a mutual distance as seen in the axial direction.

The wind turbine blade may be attached to the C-shaped bearing element or to the T-shaped bearing element by means of a plurality of bolts, e.g. steel bolts. According to this embodiment, the wind turbine blade is bolted to the C-shaped bearing element or to the T-shaped bearing element. This is a very easy and reliable manner of attaching the wind turbine blade to the bearing unit.

The bolts may be received in carrot connectors mounted in the wind turbine blade. In the present context the term 'carrot connector' should be interpreted to mean a tapered stud or the like, arranged in a root portion of the wind turbine blade. The carrot connectors may, e.g., be arranged in stepped holes drilled into an end of the root portion of the wind turbine blade, and may be secured in the holes by means of grout, such as carbon-epoxy grout. As an alternative, the insert in which the connectors are received may be formed in wedge shaped pieces of composite. The wedge shaped pieces may be produced by resin transfer molding. The wedge shape pieces may be positioned directly in a blade mold during manufacturing of the wind turbine blade. Thereby a separate gluing process can be avoided.

As an alternative, other kinds of bolts may be used, such as T-bolts. As another alternative, the wind turbine blade may be attached to the C-shaped bearing element or to the T-shaped bearing element by means of other kinds of fastening means, such as pre-tensioned wires.

The rotor may further comprise a device for controlling pitch movements of the wind turbine blade relative to the hub. The pitch movements may be controlled in accordance with various parameters, such as the wind speed of the incoming wind, a required power production level and/or various loads. For instance, the pitch movements may be controlled in such a manner that an angle of attack between the wind turbine blades and the incoming wind is obtained, which results in a required power production, while ensuring that relevant load constraints are not exceeded.

Roller elements arranged between at least one of the raceway pairs may be arranged in cages. According to this embodiment, the relative positions of the individual roller elements are maintained, since each roller element is positioned in a compartment defined by the cages. Thereby a correct spacing between the roller elements is ensured, and it is ensured that the roller elements roll at a correct radius of the bearing, i.e. the roller elements are prevented from drifting outwards or inwards. The cages could, e.g., be made from a polymer material.

As an alternative, spacers may be arranged between the roller elements of at least one of the raceway pairs. Thereby a correct spacing between the roller elements is also ensured. However, spacers will not ensure that the roller elements roll at a correct radius.

According to a second aspect the invention provides a wind turbine comprising a tower, a nacelle mounted on the tower, and a rotor according to the first aspect of the invention mounted rotatably on the nacelle. Thus, the wind turbine according to the second aspect of the invention comprises a rotor according to the first aspect of the invention. The remarks set forth above with reference to the first aspect of the invention are therefore equally applicable here.

BRIEF DESCRIPTION OF THE DRAWINGS

The invention will now be described in further detail with reference to the accompanying drawings in which.

DETAILED DESCRIPTION OF THE DRAWINGS

Figure 1:
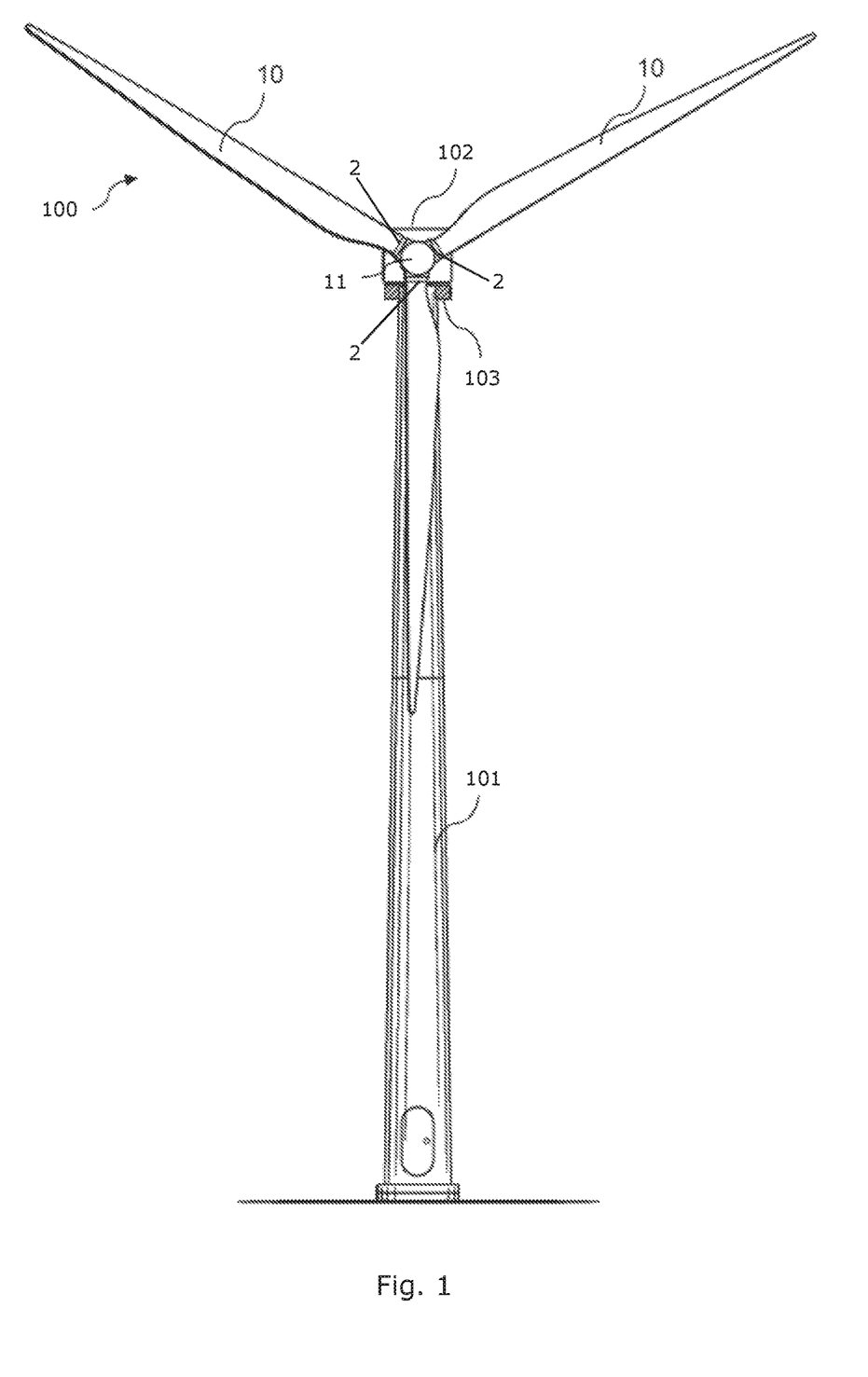
FIG. 1 is a front view of a wind turbine.

FIG. 1 is a side view of a wind turbine 100 comprising a tower 101, a nacelle 102 rotatably coupled to the top of the tower 101 by a yaw system 103, and a rotating hub 11 mounted to the nacelle 102. Three wind turbine blades 10 are each coupled to the hub 11 via a bearing unit 2. The nacelle 102 and the wind turbine blades 10 are turned and directed into the wind direction by means of the yaw system 103. The wind turbine blades 10 are rotated relative to the hub 11 by means of the bearing units 2 in order to adjust a pitch angle of the wind turbine blades 10.

The nacelle 102 may house generating components of the wind turbine, including the generator, gearbox, drive train and brake assembly, as well as convertor equipment for converting the mechanical energy of the wind into electrical energy for provision to the grid.

Figure 2:
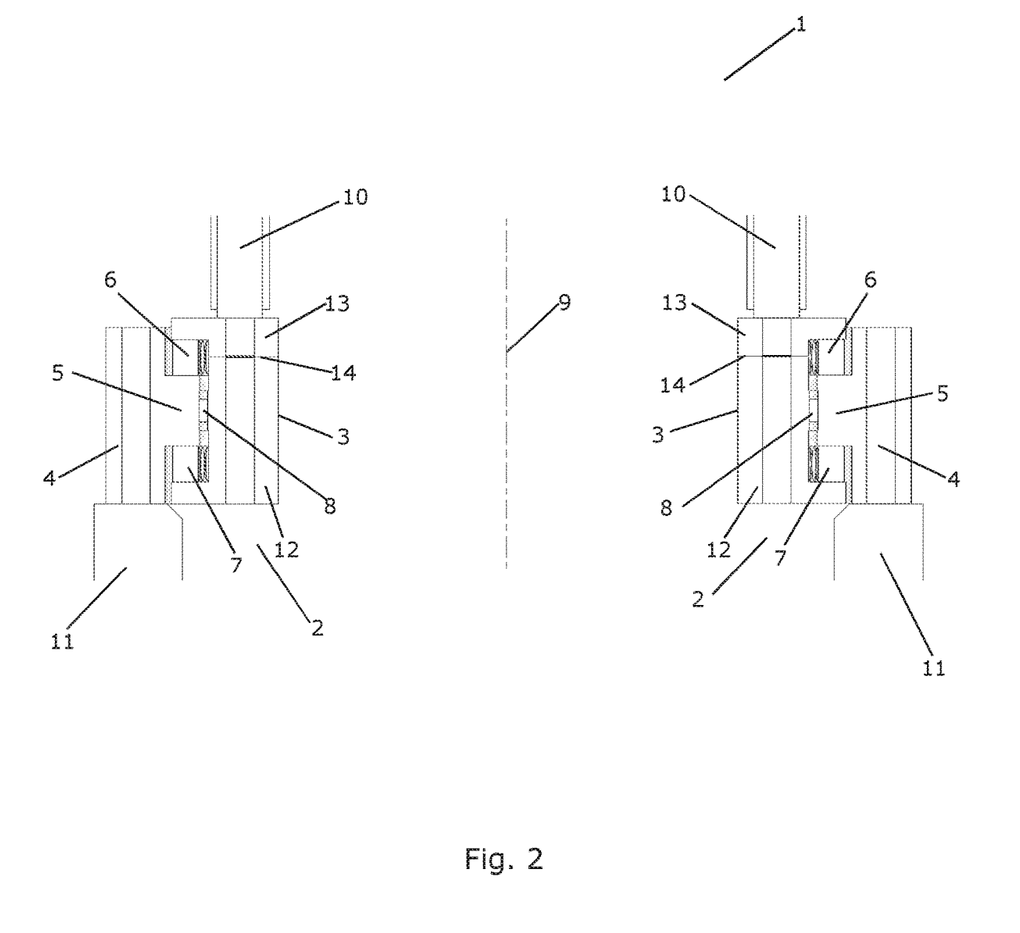
FIG. 2 is a cross sectional view of a rotor according to a first embodiment of the invention.

FIG. 2 is a cross sectional view of a rotor 1 according to a first embodiment of the invention. The rotor 1 comprises a bearing unit 2 comprising a C-shaped bearing element 3, forming an inner ring of the bearing unit 2, and a T-shaped bearing element 4, forming an outer ring of the bearing unit 2.

The T-shaped bearing element 4 comprises a protruding portion 5, which is arranged in a recess formed by the C-shaped bearing element 3. A first raceway pair 6 is formed between the protruding portion 5 of the T-shaped bearing element 4 and a first radially extending surface of the C-shaped bearing element 3. Furthermore, a second raceway pair 7 is formed between the protruding portion 5 of the T-shaped bearing element 4 and a second radially extending surface of the C-shaped bearing element 3. Finally, a third raceway pair 8 is formed between the protruding portion 5 of the T-shaped bearing element 4 and an axially extending surface of the C-shaped bearing element 3. Accordingly, the C-shaped bearing element 3 and the T-shaped bearing element 4 can perform relative rotational movements with respect to each other, about a rotational axis 9, via the three raceway pairs 6, 7, 8.

A wind turbine blade 10 is attached to the C-shaped bearing element 3, and a hub 11 is attached to the T-shaped bearing element 4. Thus, when the C-shaped bearing element 3 and the T-shaped bearing element 4 perform relative rotational movements, the wind turbine blade 10 and the hub 11 also perform relative rotational movements.

The C-shaped bearing element 3 comprises a first bearing element part 12 and a second bearing element part 13, each having an L-shape. This allows the bearing unit 2 to be assembled, with roller elements arranged in the three raceway pairs 6, 7, 8. An interface 14 is formed between the first bearing element part 12 and the second bearing element part 13, and the interface 14 is positioned in such a manner that the third raceway pair 8 is formed between the protruding portion 5 of the T-shaped bearing element 4 and the first bearing element part 12, and the wind turbine blade 10 is attached to the second bearing element part 13.

During operation, radial forces may act on the wind turbine blade 10. Such forces need to be transferred to the hub 11, and this takes place via the third raceway pair 8. Thus, the interface 14 between the first bearing element part 12 and the second bearing element part 13 is arranged in the path of the forces. It has surprisingly turned out that positioning the interface 14 between the first bearing element part 12 and the second bearing element part 13 in this manner improves the ability of the bearing unit 2 of handling high overturning moments or other extreme loads, even though this is counter-intuitive because the interface 14 is normally regarded as a weak point in the design.

Figure 3:
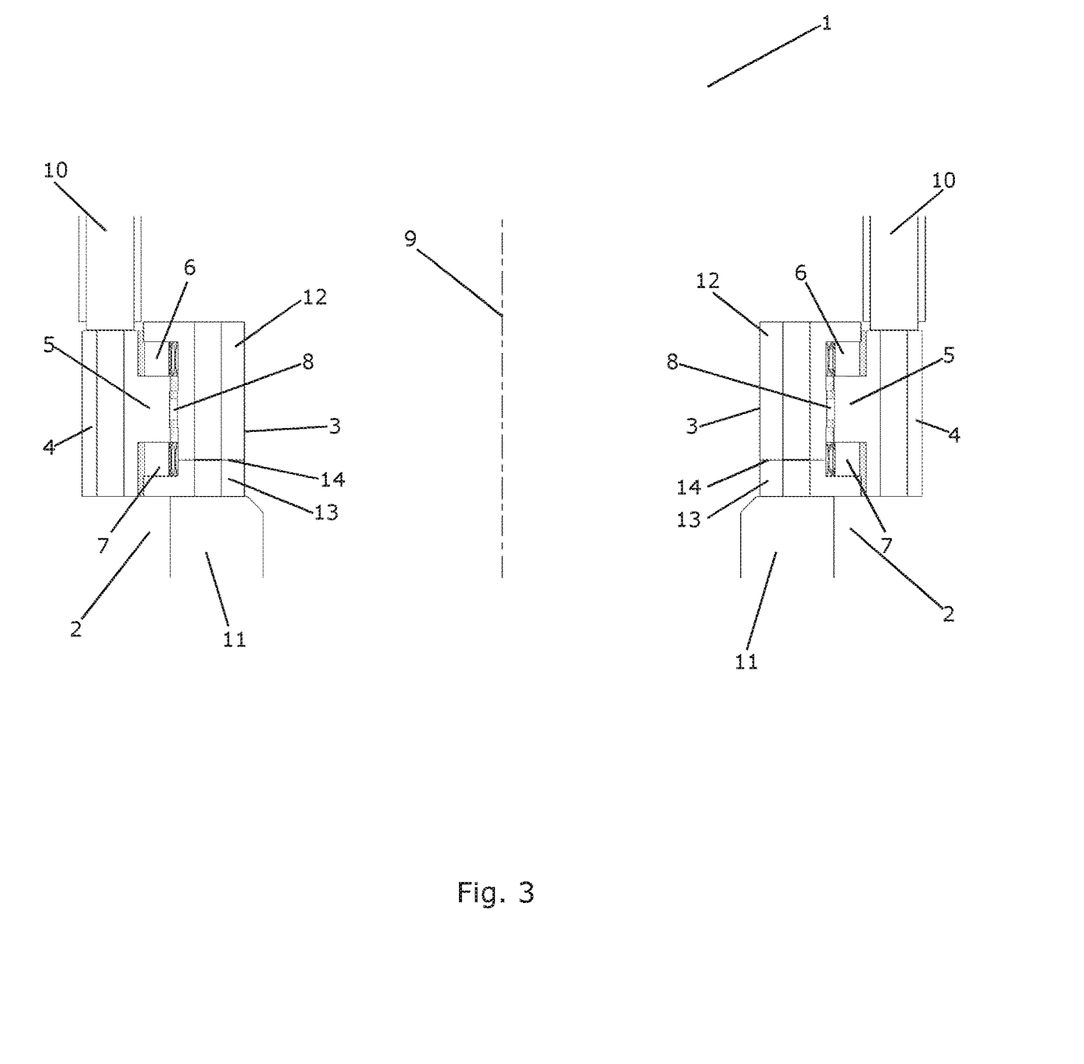
FIG. 3 is a cross sectional view of a rotor according to a second embodiment of the invention.

FIG. 3 is a cross sectional view of a rotor 1 according to a second embodiment of the invention. The rotor 1 of FIG. 3 is very similar to the rotor 1 of FIG. 2, and it will therefore not be described in detail here.

In the rotor 1 of FIG. 3, the hub 11 is attached to the second bearing element part 13 of the C-shaped bearing element 3, and the wind turbine blade 10 is attached to the T-shaped bearing element 4. However, the interface 14 between the first bearing element part 12 and the second bearing element part 13 of the C-shaped bearing element 3 is still positioned in such a manner that radial forces acting on the wind turbine blade 10 pass the interface 14 when being transferred to the hub 11 via the third raceway pair 8.

Figure 4:
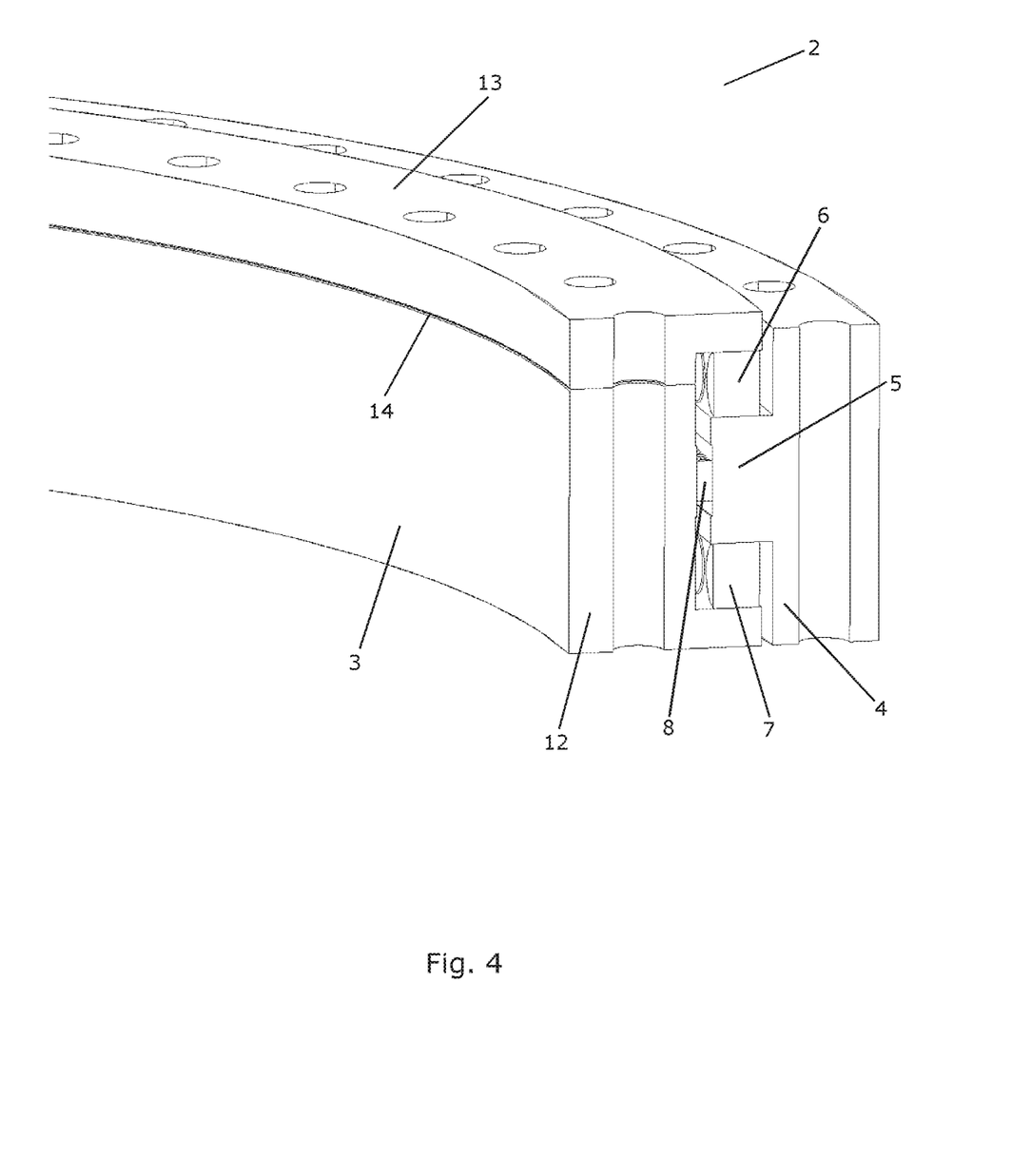
FIG. 4 is a perspective view of part of a bearing unit for the rotor of FIG. 2.

FIG. 4 is a perspective view of part of a bearing unit 2 for the rotor of FIG. 2. Part of the bearing unit 2 has been broken away in order to reveal details of the interior of the bearing unit 2. It should, however, be understood that the bearing unit 2 forms a closed ring. The position of the interface 14 between the first bearing element part 12 and the second bearing element part 13 can be clearly seen. A wind turbine blade can be mounted on the second bearing element part 13.

Figure 5:
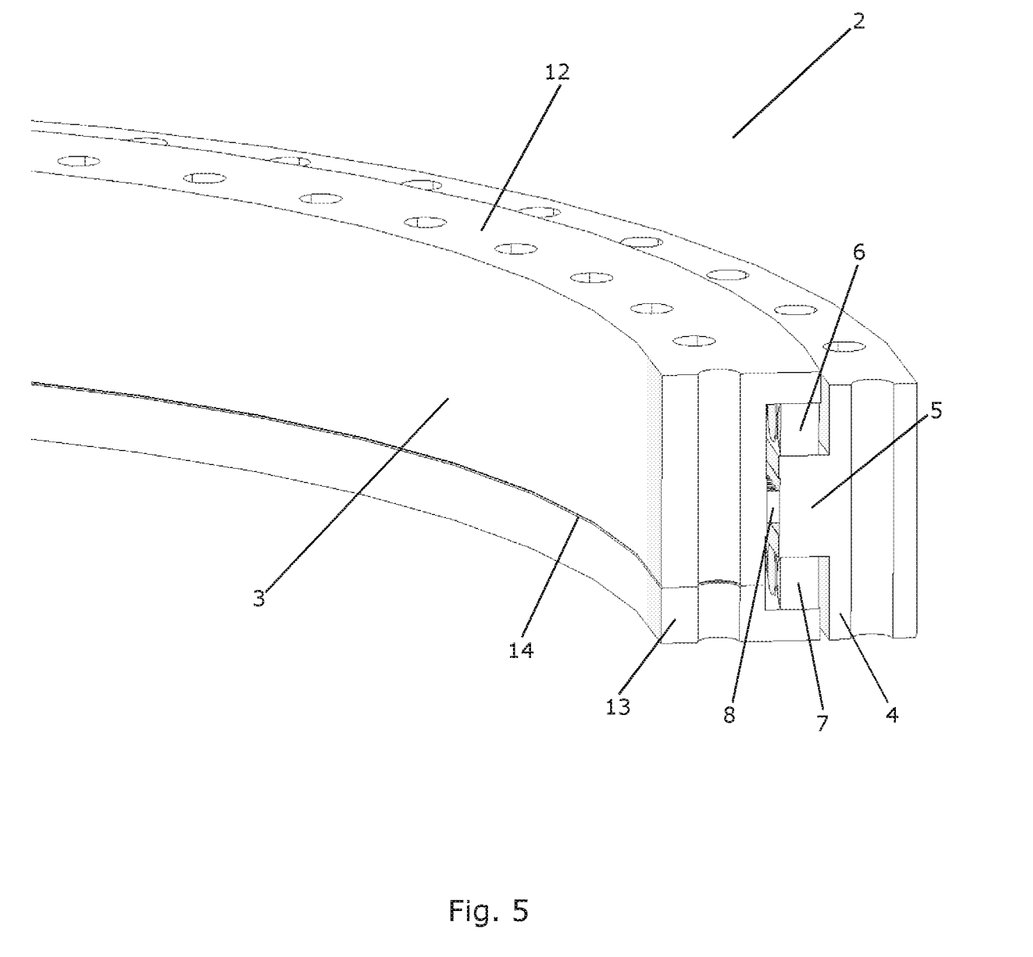
FIG. 5 is a perspective view of part of a bearing unit for the rotor of FIG. 3.

FIG. 5 is a perspective view of part of a bearing unit 2 for the rotor of FIG. 3. Part of the bearing unit 2 has been broken away in order to reveal details of the interior of the bearing unit 2. It should, however, be understood that the bearing unit 2 forms a closed ring. The position of the interface 14 between the first bearing element part 12 and the second bearing element part 13 can be clearly see. A hub can be mounted on the second bearing element part 13.

Figure 6:
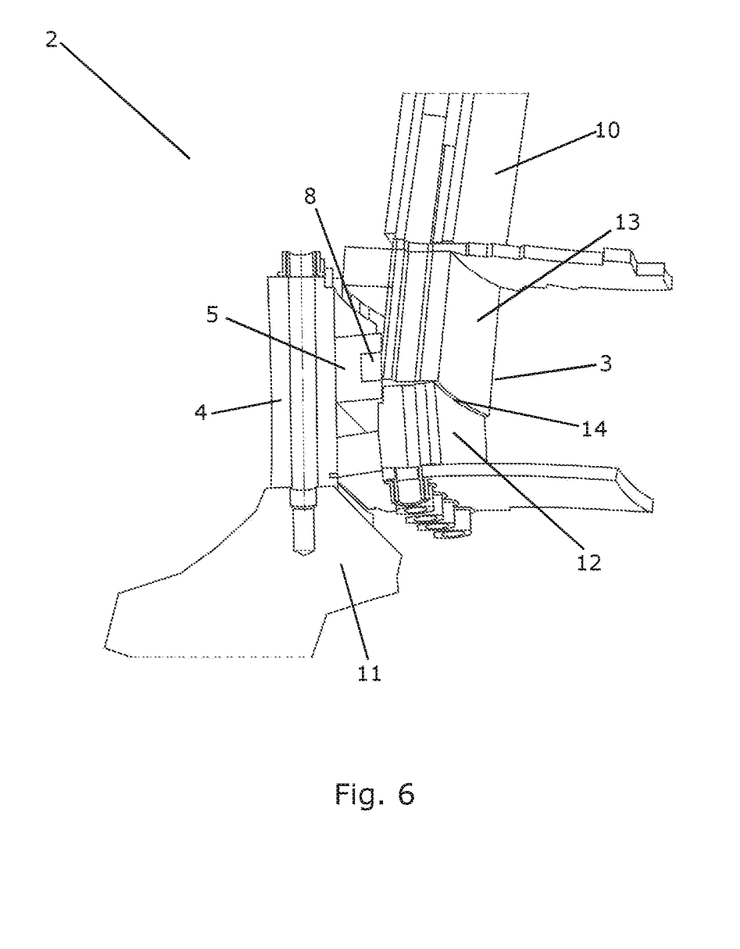
FIG. 6 illustrates extreme loads acting on a bearing unit for a prior art rotor.

FIG. 6 illustrates extreme loads, in the form of extreme kip moments, acting on a bearing unit 2 for a prior art rotor. The illustration is based on finite element analysis (FEA) calculations. The bearing unit 2 comprises a C-shaped bearing element 3, forming an inner ring of the bearing unit 2, and a T-shaped bearing element 4, forming an outer ring of the bearing unit 2. The T-shaped bearing element 4 comprises a protruding portion 5, a wind turbine blade 10 is attached to the C-shaped bearing element 3, and a hub 11 is attached to the T-shaped bearing element 4, as described above with reference to FIG. 2.

The C-shaped bearing element 3 comprises a first bearing element part 12 and a second bearing element part 13 with an interface 14 formed there between. However, in the bearing unit 2 of FIG. 6, the interface 14 is positioned in such a manner that a raceway pair 8 is formed between the protruding portion 5 of the T-shaped bearing element 4 and the second bearing element part 13 of the C-shaped bearing element 3, which is also the one having the wind turbine blade 10 attached thereto. Accordingly, radial forces acting on the wind turbine blade 10, and which need to be transferred to the hub 11, via the raceway pair 8, will not pass the interface 14.

It can be seen from FIG. 6 that this position of the interface 14 has the consequence that extreme kip moments acting on the wind turbine blade 10 results in a gap being introduced between the first bearing element part 12 and the second bearing element part 13, at the interface 14. Furthermore, it can be seen that the second bearing element part 12 is sliding in an inwards direction relative to the first bearing element part 13. Such gapping and sliding is undesirable, since they may cause increased wear and fatigue on the bearing unit 2.

Figure 7:
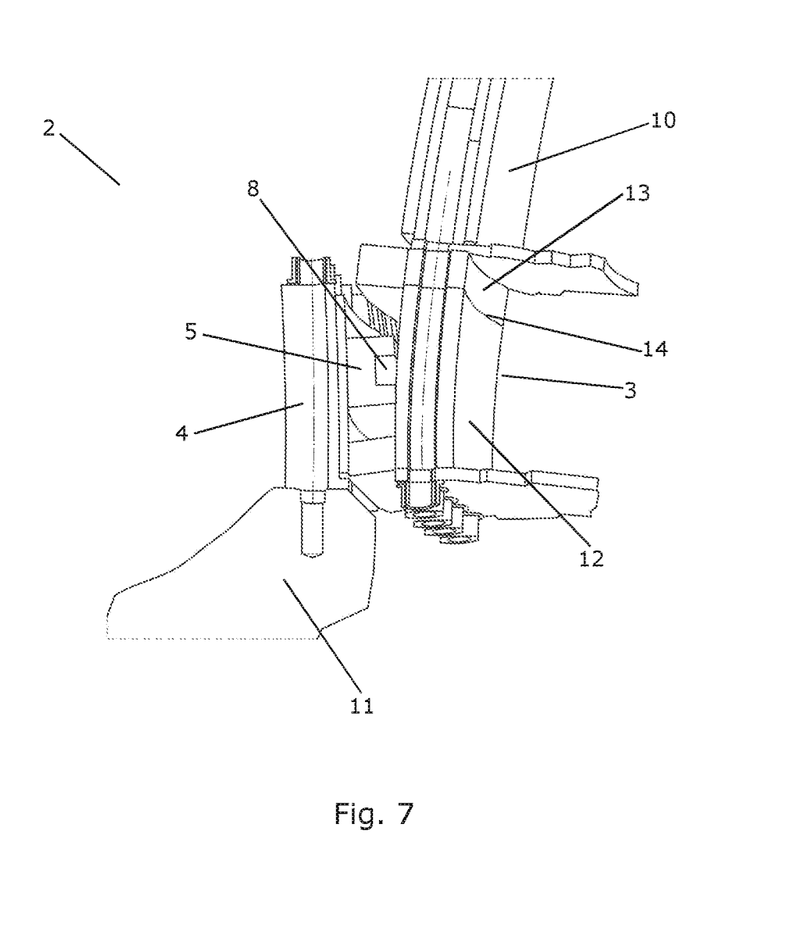
FIG. 7 illustrates extreme loads acting on a bearing unit for a rotor according to an embodiment of the invention.

FIG. 7 illustrates extreme loads, in the form of extreme kip moments, acting on a bearing unit 2 for a rotor according to an embodiment of the invention. The illustration is based on finite element analysis (FEA) calculations, and the conditions for the calculations, including load level, bearing design, and deformation scaling, are identical to the conditions underlying the calculations forming the basis of the calculations illustrated in FIG. 6. The bearing unit 2 illustrated in FIG. 7 is very similar to the bearing unit 2 of FIG. 6, and it will therefore not be described in detail here.

However, in the bearing unit of FIG. 7, the interface 14 between the first bearing element part 12 and the second bearing element part 13 is positioned in such a manner that a raceway pair 8 is formed between the protruding portion 5 of the T-shaped bearing element 4 and the first bearing element part 12 of the C-shaped bearing element 3. Thereby, radial forces acting on the wind turbine blade 10, and which need to be transferred to the hub 11, via the roller elements of the raceway pair 8, pass the interface 14.

It can be seen from FIG. 7 that this position of the interface 14 results in a significantly reduced gap between the first bearing element part 12 and the second bearing element part 13, as compared to the situation illustrated in FIG. 6. Furthermore, the relative sliding between the first bearing element part 12 and the second bearing element part 13 is significantly reduced, as compared to the situation illustrated in FIG. 6. Accordingly, derived failure modes such as loss of bolt pretension, bolt fatigue, and raceway fatigue on the bearing unit 2 are also significantly reduced.

The reduced gap and sliding between the bearing element parts 12, 13 could be caused by one or more of the following.

The cross sectional area of the first bearing element part 12 is larger in the bearing unit 2 of FIG. 7 than in the bearing unit 2 of FIG. 6. This makes the first bearing element part 12 stiffer with respect to twisting about its centre of torsional area-moment of inertia, thereby reducing the gap between the first bearing element part 12 and the second bearing element part 13.

Furthermore, in the bearing unit 2 of FIG. 7, the first bearing element part 12 is supported by the radial row of roller elements of the raceway pair 8, and this is not the case in the bearing unit 2 of FIG. 6. Therefore, in order of the bearing element parts 12, 13 of the bearing unit 2 of FIG. 7 to slide, the radial row of roller elements must be compressed, while this is not required for the bearing unit 2 of FIG. 6.

Finally, for sliding to occur, the first bearing element part 12 undergoes a rotation approximately about the center of its torsional area-moment of inertia. The cause of the rotation is primarily from a moment arising from a radial offset between a retaining axial force from the raceway pair 8 on the first bearing element part 12 and an axial force originating from the blade kip moment acting through the interface 14. The contact pressure in the interface 14 can, through friction, provide a retaining force on the first bearing element part 12 acting in the radial direction and located at the interface 14, which prohibits sliding. The longer away this retaining force is located from the center of rotation of the first bearing element part 12, the more influence this force has because the moment-arm increases.

It should be noted that the deformations illustrated in FIGS. 6 and 7 are exaggerated in order to demonstrate the effects described above. Thus, in reality the gap and sliding would be too small to distinguish in the Figures.

The invention claimed is:

1. A rotor for a wind turbine, the rotor comprising a hub and at least one wind turbine blade, each wind turbine blade being mounted on the hub via a bearing unit and being rotatable about an axis of rotation of the bearing unit, each bearing unit comprising:
    a C-shaped bearing element defining an axially arranged surface and two radially arranged surfaces, the C-shaped bearing element forming an inner ring of the bearing unit, and
    a T-shaped bearing element comprising a protruding portion arranged between the radially arranged surfaces of the C-shaped bearing element, the T-shaped bearing element forming an outer ring of the bearing unit,
    wherein the bearing unit includes only three raceway pairs, comprising:
        a first raceway pair being formed between the protruding portion of the T-shaped bearing element and a first radially arranged surface of the C-shaped bearing element,
        a second raceway pair being formed between the protruding portion of the T-shaped bearing element and a second radially arranged surface of the C-shaped bearing element, and
        a third raceway pair being formed between a surface of the protruding portion of the T-shaped bearing element that extends parallel to the axis of rotation of the bearing unit and the axially arranged surface of the C-shaped bearing element,
    wherein the hub is attached to one of the C-shaped bearing element and the T-shaped bearing element and a wind turbine blade is attached to and movable with the other of the C-shaped bearing element and the T-shaped bearing element,
    wherein the C-shaped bearing element comprises a first bearing element part and a second bearing element part, and an interface between the first bearing element part and the second bearing element part is positioned in such a manner that the third raceway pair is formed between the protruding portion of the T-shaped bearing element and the first bearing element part of the C-shaped bearing element and the hub or the wind turbine blade is attached to the second bearing element part of the C-shaped bearing element such that the second bearing element part is positioned closer to the hub or the wind turbine blade attached to the second bearing element part compared to the first bearing element part, and
    wherein the interface between the first bearing element part and the second bearing element part is positioned between the protruding portion of the T-shaped bearing element and one of the radially arranged surfaces of the C-shaped bearing element, as viewed along an axial direction.

2. The rotor according to claim 1, wherein the hub is attached to the T-shaped bearing element, and the wind turbine blade is attached to the C-shaped bearing element.

3. The rotor according to claim 1, wherein the interface between the first bearing element part and the second bearing element part of the C-shaped bearing element is positioned closer to one of the radially arranged surfaces of the C-shaped bearing element than to the protruding portion of the T-shaped bearing element.

4. The rotor according to claim 1, wherein the interface between the first bearing element part and the second bearing element part of the C-shaped bearing element intersects a part of the C-shaped bearing element defining one of the radially arranged surfaces of the C-shaped bearing element.

5. The rotor according to claim 1, wherein the first bearing element part and the second bearing element part of the C-shaped bearing element are assembled by means of bolts.

6. The rotor according to claim 1, wherein the hub or the wind turbine blade is attached to a radially extending part of the C-shaped bearing element, the radially extending part defining one of the radially arranged surfaces.

7. The rotor according to claim 1, wherein the radially arranged surfaces of the C-shaped bearing element are axially displaced from each other.

8. The rotor according to claim 1, wherein the wind turbine blade is attached to the C-shaped bearing element or to the T-shaped bearing element by means of a plurality of bolts.

9. The rotor according to claim 1, wherein the C-shaped bearing element is movable relative to the T-shaped bearing element to permit pitch movements of the wind turbine blade relative to the hub.

10. The rotor according to claim 1, wherein roller elements arranged between at least one of the raceway pairs are arranged in cages.

11. A wind turbine comprising a tower, a nacelle mounted on the tower, and a rotor according to claim 1 mounted rotatably on the nacelle.

12. A rotor for a wind turbine, the rotor comprising a hub and at least one wind turbine blade, each wind turbine blade being mounted on the hub via a bearing unit, each bearing unit comprising:
   a C-shaped bearing element defining an axially arranged surface and two radially arranged surfaces, the C-shaped bearing element forming an inner ring of the bearing unit,
   a T-shaped bearing element comprising a protruding portion arranged between the radially arranged surfaces of the C-shaped bearing element, the T-shaped bearing element forming an outer ring of the bearing unit,
   a first raceway pair being formed between the protruding portion of the T-shaped bearing element and a first radially arranged surface of the C-shaped bearing element, the first raceway pair accommodating a first plurality of roller bearings,
   a second raceway pair being formed between the protruding portion of the T-shaped bearing element and a second radially arranged surface of the C-shaped bearing element, the second raceway pair accommodating a second plurality of roller bearings, and
   a third raceway pair being formed between the protruding portion of the T-shaped bearing element and the axially arranged surface of the C-shaped bearing element, the third raceway pair accommodating a third plurality of roller bearings,
   wherein the C-shaped bearing element comprises a first bearing element part and a second bearing element part joined together at an interface at the axially arranged surface, the interface being spaced away from where the third plurality of roller bearings engage the axially arranged surface such that the third raceway pair is formed between the protruding portion of the T-shaped bearing element and the first bearing element part of the C-shaped bearing element,
   wherein the hub is attached to one of the second bearing element part of the C-shaped bearing element and the T-shaped bearing element and a wind turbine blade is attached to and movable with the other of the second bearing element part of the C-shaped bearing element and the T-shaped bearing element such that the second bearing element part is positioned closer to the hub or the wind turbine blade attached to the second bearing element part compared to the first bearing element part, and
   wherein the interface intersects the axially arranged surface at a location that is outside a region of the axially arranged surface that opposes the protruding portion of the T-shaped bearing element.

13. The rotor according to claim 12, wherein the interface intersects the axially arranged surface at a location that opposes one of either the first raceway pair or the second raceway pair.

14. The rotor according to claim 12, wherein the interface intersects the axially arranged surface at a location that is closer to one of the radially arranged surfaces than to the protruding portion of the T-shaped bearing element.

15. A rotor for a wind turbine, the rotor comprising a hub and at least one wind turbine blade, each wind turbine blade being mounted on the hub via a bearing unit, each bearing unit comprising:
   a C-shaped bearing element defining an axially arranged surface and two radially arranged surfaces, the C-shaped bearing element forming an inner ring of the bearing unit, and
   a T-shaped bearing element comprising a protruding portion arranged between the radially arranged surfaces of the C-shaped bearing element, the T-shaped bearing element forming an outer ring of the bearing unit,
   wherein the bearing unit includes only three raceway pairs, comprising:
      a first raceway pair being formed between the protruding portion of the T-shaped bearing element and a first radially arranged surface of the C-shaped bearing element,
      a second raceway pair being formed between the protruding portion of the T-shaped bearing element and a second radially arranged surface of the C-shaped bearing element, and
      a third raceway pair being formed between the protruding portion of the T-shaped bearing element and the axially arranged surface of the C-shaped bearing element,
   wherein the hub is attached to one of the C-shaped bearing element and the T-shaped bearing element and a wind turbine blade is attached to and movable with the other of the C-shaped bearing element and the T-shaped bearing element,
   wherein the C-shaped bearing element comprises a first bearing element part and a second bearing element part, and an interface between the first bearing element part and the second bearing element part is positioned in such a manner that the third raceway pair is formed between the protruding portion of the T-shaped bearing element and the first bearing element part of the C-shaped bearing element and the hub or the wind turbine blade is attached to the second bearing element part of the C-shaped bearing element such that the second bearing element part is positioned closer to the hub or the wind turbine blade attached to the second bearing element part compared to the first bearing element part, and
   wherein the interface is positioned between the protruding portion of the T-shaped bearing element and one of the radially arranged surfaces of the C-shaped bearing element, as viewed along an axial direction, and the interface is positioned closer to the one radially arranged surface of the C-shaped bearing element than to the protruding portion of the T-shaped bearing element.

16. A rotor for a wind turbine, the rotor comprising a hub and at least one wind turbine blade, each wind turbine blade being mounted on the hub via a bearing unit, each bearing unit comprising:
   a C-shaped bearing element defining an axially arranged surface and two radially arranged surfaces, the C-shaped bearing element forming an inner ring of the bearing unit,
   a T-shaped bearing element comprising a protruding portion arranged between the radially arranged surfaces of the C-shaped bearing element, the T-shaped bearing element forming an outer ring of the bearing unit,
   a first raceway pair being formed between the protruding portion of the T-shaped bearing element and a first radially arranged surface of the C-shaped bearing element, the first raceway pair accommodating a first plurality of roller bearings, a second raceway pair being formed between the protruding portion of the T-shaped bearing element and a second radially arranged surface of the C-shaped bearing element, the second raceway pair accommodating a second plurality of roller bearings, and a third raceway pair being formed between the protruding portion of the T-shaped bearing element and the axially arranged surface of the C-shaped bearing element, the third raceway pair accommodating a third plurality of roller bearings, wherein the C-shaped bearing element comprises a first bearing element part and a second bearing element part joined together at an interface at the axially arranged surface, the interface being spaced away from where the third plurality of roller bearings engage the axially arranged surface such that the third raceway pair is formed between the protruding portion of the T-shaped bearing element and the first bearing element part of the C-shaped bearing element, wherein the hub is attached to one of the second bearing element part of the C-shaped bearing element and the T-shaped bearing element and a wind turbine blade is attached to and movable with the other of the second bearing element part of the C-shaped bearing element and the T-shaped bearing element such that the second bearing element part is positioned closer to the hub or the wind turbine blade attached to the second bearing element part compared to the first bearing element part, and wherein the interface intersects the axially arranged surface at a location that is closer to one of the radially arranged surfaces than to the protruding portion of the T-shaped bearing element.

* * * * *